Sept. 2, 1969        T. L. GRAY        3,464,509

WHEEL SCALE

Filed Jan. 11, 1967        3 Sheets-Sheet 1

Tommy L. Gray
INVENTOR.

BY
ATTORNEY

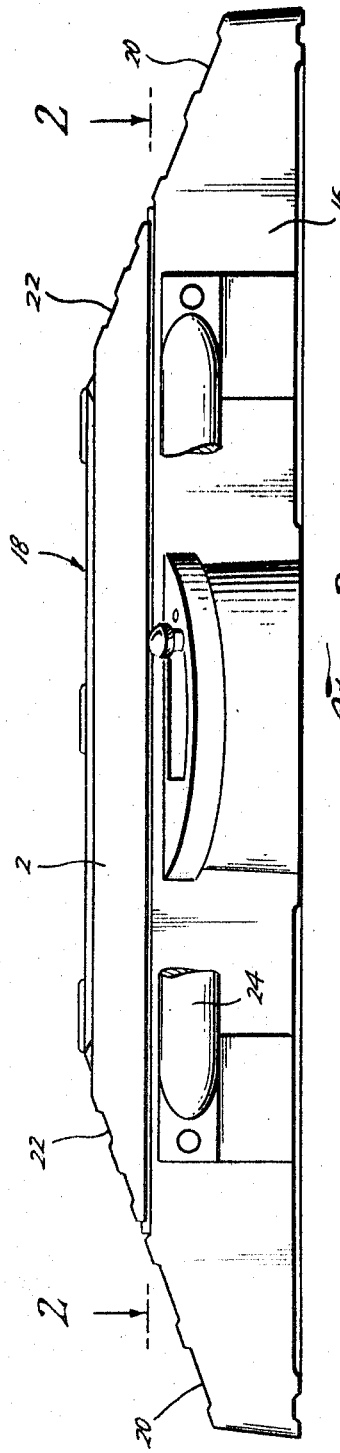
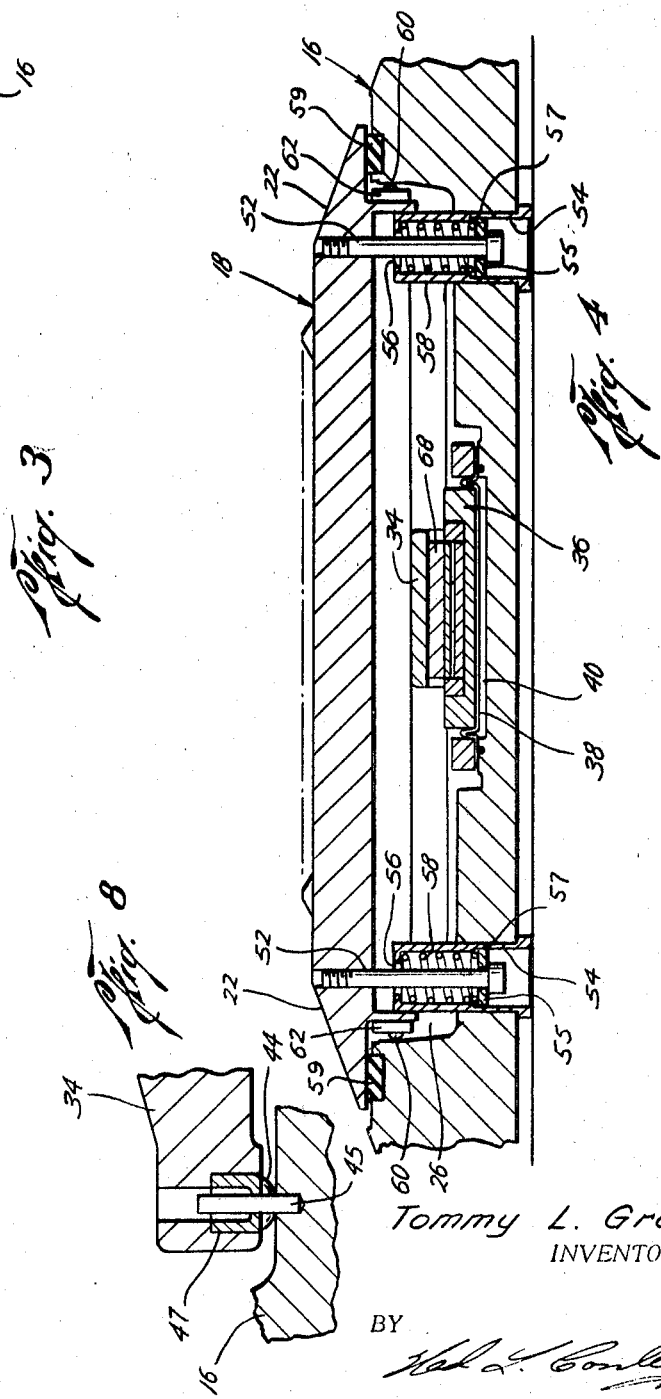

Sept. 2, 1969  T. L. GRAY  3,464,509
WHEEL SCALE
Filed Jan. 11, 1967  3 Sheets-Sheet 3
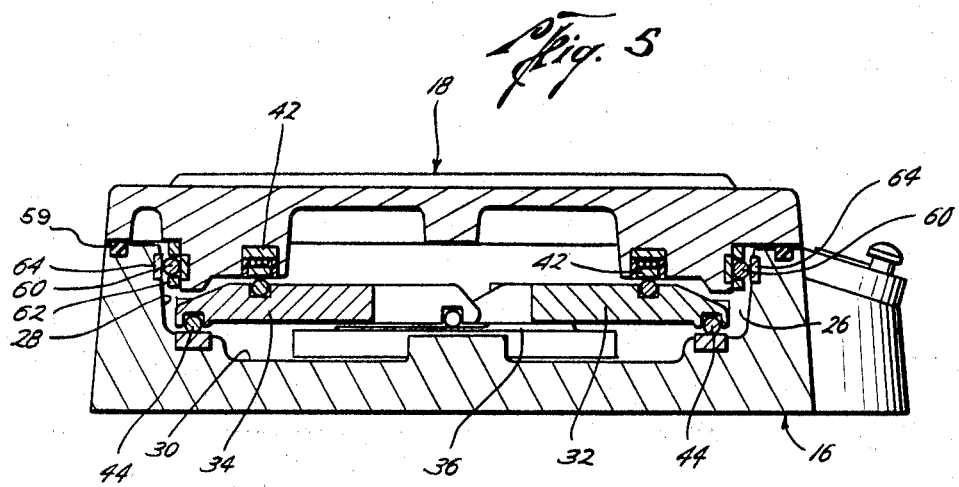
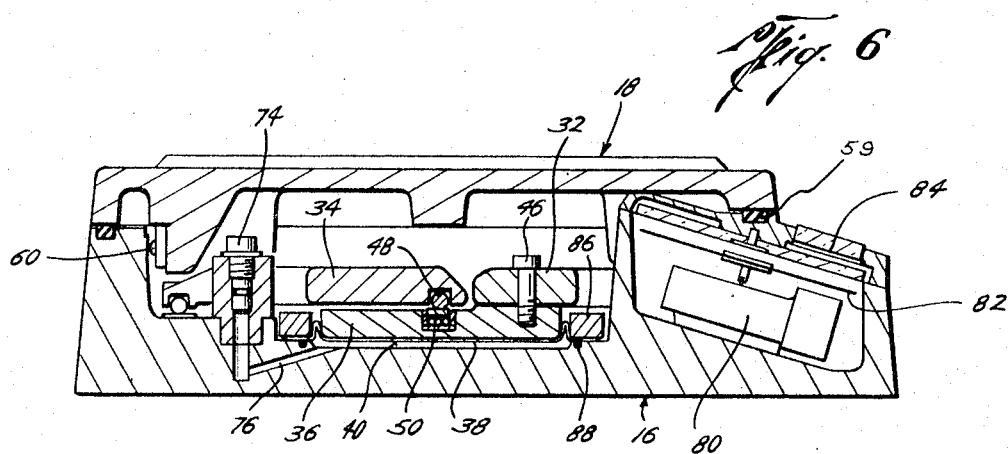
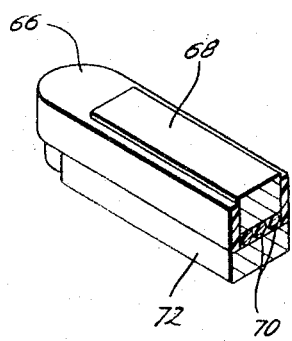
Tommy L. Gray
INVENTOR.
BY
ATTORNEY United States Patent Office 3,464,509
Patented Sept. 2, 1969

3,464,509
WHEEL SCALE
Tommy L. Gray, Dallas, Tex., assignor to General Electrodynamics Corporation, Garland, Tex., a corporation of Texas
Filed Jan. 11, 1967, Ser. No. 608,526
Int. Cl. G01g 5/04
U.S. Cl. 177—208                                   11 Claims

ABSTRACT OF THE DISCLOSURE

A portable scale for weighing wheeled vehicles by driving the wheeled vehicle onto the scale in which two longitudinally extending lever arms bear on a piston resting on a hydraulic diaphragm to exert pressure on a hydraulic fluid. One lever arm is rigidly attached to the piston and the other engages the piston through a frictionless bearing. The pressure of the hydraulic fluid is read to determine the load on the scale.

BACKGROUND OF THE INVENTION

This invention relates to weighing apparatus, and more particularly, it relates to apparatus especially designed for weighing trucks and other wheeled vehicles.

There is a substantial demand for lightweight portable apparatus which can be used for weighing automobiles, trucks, airplanes, and other mobile equipment. Such portable apparatus is particularly needed for weighing trucks. In order to prevent damage to highways and bridges, the governments of various jurisdictions have enacted laws which limit the weight of load allowable upon axles of vehicles such as trucks, semitrailers, trailers, and the like within their respective jurisdictions. Proper enforcement of such laws requires maintaining vehicle or truck-weighing stations at selected locations on highways. Ease of portability is particularly important where it is desired to set up an auxiliary weighing station which may be used for only a short time. Various structures have heretofore been utilized for portable weighing devices for this purpose; however, many of such structures previously provided have been generally unsuitable because of fragility and lack of accuracy. Examples of such weighing devices which are known in the prior art include those disclosed in the following patents: U.S. 1,844,080; U.S. 2,156,325; U.S. 2,269,969; U.S. 3,191,701; British 271,314; and German 440,258.

Inaccuracies in prior art scales have often been caused by frictional resistance within the mechanism, which causes hysteresis, and by the inability of the apparatus to compensate for temperature changes. Other difficulties are caused by the sudden shock loading of a truck wheel driving upon the weighing platform which damages the apparatus or throws it out of adjustment.

SUMMARY OF THE INVENTION

The present invention is designed to provide an economical, commercially satisfactory solution to the foregoing problems. Briefly, the invention comprises the utilization of a scale which is adapted to have the truck wheel driven upon it. In the scale of this invention a platform rests upon an assembly by linkage arms which bear upon a piston to exert pressure upon a hydraulic fluid. A reading of this pressure provides an indication of the weight exerted by the wheel. In a preferred embodiment of the invention the linkage assembly is pivoted about axes extending generally parallel to the direction of movement of the truck wheel so as to greatly reduce problems arising when the weight of the wheel bears more on one link of the linkage assembly than on the other. Reduction of hysteresis in the linkage assembly is accomplished by rigidly affixing one link to the piston while having the other free to move laterally on the piston. Free lateral movement which is substantially frictionless is provided by a unique bearing design. The fastening of one link rigidly to the piston while the other floats freely thereon greatly improves the accuracy of the scale. Compensation for temperature changes is not required.

By utilization of damping in the hydraulic system of this scale, it can be used to weigh a truck while the wheel is moving across it. For more accurate measurements, however, a static measurement is most desirable.

DESCRIPTION OF THE DRAWING

For a better understanding of the invention, reference is now made to the accompanying drawing, wherein
FIGURE 3 is an elevational view of the embodiment of FIGURE 2;
FIGURE 4 is a longitudinal sectional view of the embodiment of FIGURE 2 taken at line 4—4 of FIGURE 2;
FIGURE 5 is a sectional view of the embodiment of FIGURE 2 taken at line 5—5 of FIGURE 2;
FIGURE 6 is a sectional view of the embodiment shown in FIGURE 2 taken at line 6—6 of FIGURE 2;
FIGURE 7 is a fragmentary view of one embodiment of a bearing which may be used in the scale shown in FIGURE 2;
and
  FIGURE 8 is a fragmentary view of a portion of the scale, taken at line 8—8 on FIGURE 2.

Figure 1:
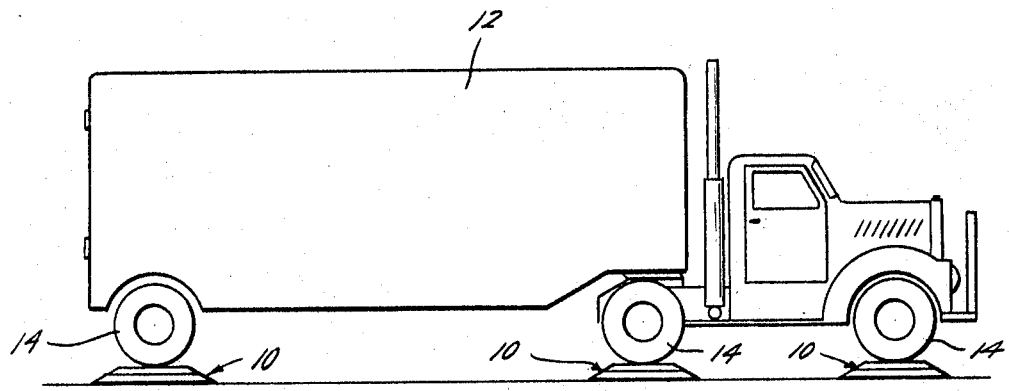
FIGURE 1 is an elevational view of a truck showing all of the wheels of the truck resting upon weighing devices in accordance with this invention.

Referring first to FIGURE 1 of the drawing, it will be seen that the weighing devices 10 are used to weigh a truck 12 by driving the wheels 14 of the truck onto the plurality of the weighing devices. In the embodiment shown, the weighing apparatus comprises a base number 16 having a platform 18 superimposed thereon. The base is preferably of a generally flat rectangular form, but slopes downwardly on each end 20 from the upper surface to adjacent the lower surface, which is normally disposed to sit upon the ground. The ends 20 are grooved to provide traction for a vehicle wheel. The weighing platform 18 also has a generally flat rectangular shape, and is also provided with downwardly sloping ends 22 which are aligned with the sloping ends of the base 16 and are also grooved for the provision of traction for a vehicle wheel. The base is provided with a handle 24 for use in carrying the apparatus.

A depression or chamber 26 is formed in the upper surface of the base and is provided with side walls 28 and a bottom 30. A pair of scale levers or links 32 and 34 received within the chamber 26 provide means for transmitting the load exerted on the platform to a piston 36 which overlies a conventional rolling diaphragm 38 (as, for example, of the Bellofram type) which encloses a diaphragm chamber 40.

As most clearly seen in FIGURE 5, the platform 18 is supported on the levers 32 and 34 through bearing assemblies 42 which extend longitudinally of the platform along either side. The levers 32 and 34 are in turn supported at their outer edges by means of fulcrum rollers or pins 44.

Figure 2:
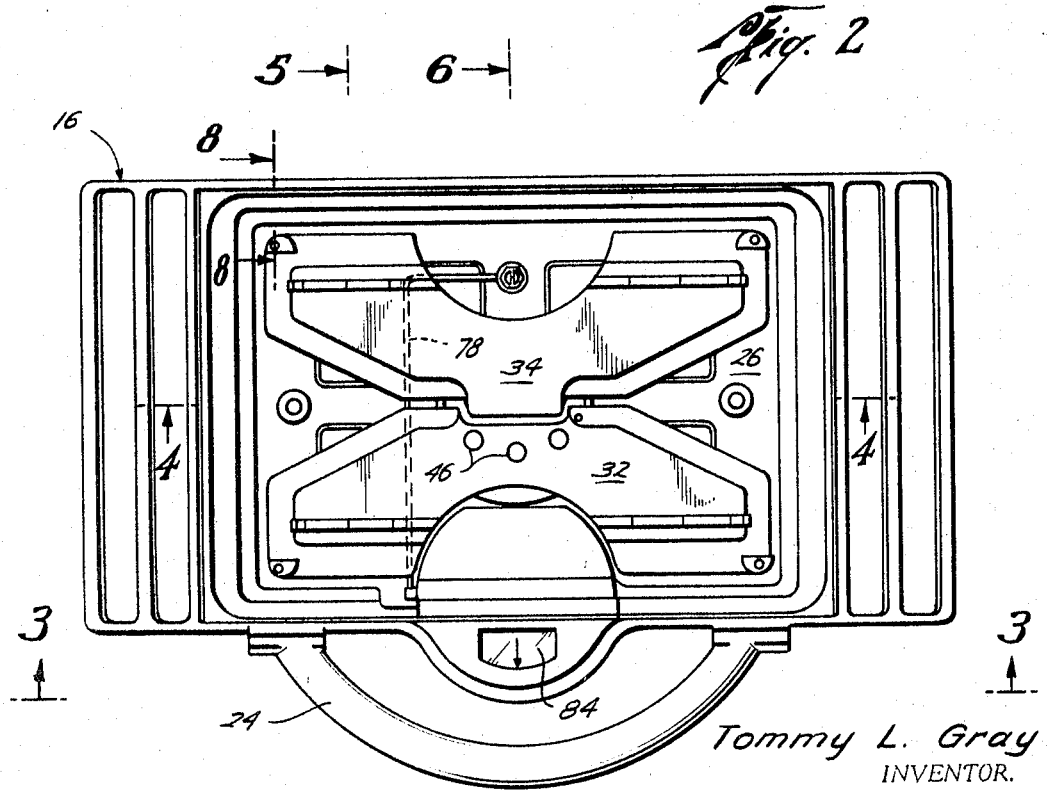
FIGURE 2 is a plan view of a preferred embodiment of a truck scale incorporating the present invention with the platform removed.

As may be seen in FIGURE 2, the levers 32 and 34 extend substantially the full length of the chamber 26 at their outer edges, but converge to a narrower width at their inner edges. Thus, these levers are so shaped as to insure a relatively uniform application of forces thereto and to insure the transmission of such forces to the piston 36. In addition, since they extend lengthwise of the scale, much better distribution of platform weight is obtained, and stress in the levers is reduced.

As shown in the drawing, lever 32 is rigidly attached to the piston by means of cap screws 46. Lever 34, on the other hand, is not attached to the piston, but instead rests upon a fulcrum pin 48 which in turn rests upon a frictionless bearing assembly 50 positioned in the upper surface of the piston.

The levers are relatively accurately located by pins 45, which are driven into the base and received through bushings 47 at the outer corners of the levers. Bushings 47 are centered on rollers 44, and are enlarged through a major portion of their lengths, so that only a small portion of the bushing, adjacent the lower surface of the lever, fits fairly closely to the pin. There is enough looseness, however, to allow the slight rocking of the lever which is necessary during weighing operations.

The entire assembly is held together by means of cap screws 52, each of which is positioned in a spring housing 54, the spring housing in turn being secured in the base and extending upwardly from the bottom of the chamber 26 toward the platform 18. The upper end of the spring housing is provided with a reduced diameter opening 56 therethrough, through which the shank of the cap screw 52 extends. A spring 58 is positioned between a washer 55 under the head of the cap screw 52 and the shoulder formed at the upper end of the spring housing around the opening 56. The cap screw 52 extending through the opening is threadedly engaged with the platform 18, and moves vertically with the platform against the spring pressure. Upward movement of the platform is limited by engagement of the washer with a shoulder 57 in the spring housing. This arrangement prevents the platform from tipping too far when load is applied on one edge of the platform, and eliminates the need for locks which must be released after the wheel is centered on the platform. Thus, an annular compressible dust seal 59 may be positioned beneath an overhanging lip of the platform and a satisfactory seal maintained at all times.

The hold-down springs 58 preferably have little or no initial compression, or otherwise, if they are initially compressed, the forces resulting from such compression cause a shift in the zero point and are taken into account in calibration of the weighing mechanism.

Forces tending to move the platform 18 laterally with respect to the base are absorbed by means of cylindrical pins 60 which are rotatably received in housings 62 which are attached to the ends and sides of the platform which extend down within the depression or chamber of the base. These rollers or cylindrical pins 60 engage hardened plates 64 which are affixed in the walls 28 of the chamber 26.

The bearing assemblies 42 and 50 are of generally similar design and are particularly designed to provide substantially frictionless engagement between adjacent elements. In the embodiment shown in FIGURE 7, the bearing assembly comprises a resilient housing 66 made of a resilient synthetic rubber or the like and having a cavity within which there is received a hardened steel block 68. The hardened steel block rests upon a plurality of longitudinally extending bearing pins 70 which in turn rest upon another hardened steel block 72. The entire assembly is lubricated, with the resilient housing 66 functioning as a seal for the lubricant, while resiliently yielding upon movement of the block 68. Thus, if there is lateral movement of the fulcrum pin 48, any friction between the fulcrum pin and the block 68 would merely tend to cause rolling of the bearing pins 70, and therefore there is substantially no frictional resistance to lateral motion over a very short distance. It will be appreciated that lateral movement of the fulcrum pins is extremely minute in this apparatus, being caused only by temperature changes and by the pivoting of the levers.

The hydraulic system of this apparatus is filled through the opening shown closed by plug 74 in FIGURE 6. A passageway 76 connects with the diaphragm chamber 40, and fluid conduit 78 connects with a pressure gauge 80. The pressure gauge 80 is provided with a dial 82 which may be read through a viewing glass 84 to determine the load on the scale. Preferably, the pressure gauge is calibrated and designed to read directly in pounds load, such calibration taking into account lever ratios and the effective area of the diaphragm as well as the tare weight resulting from the weight of the platform and the levers and any forces exerted by the springs.

The scale of this invention is particularly designed for static weighing; that is, with the wheels stationary on the scale. With the links or levers being pivoted on fulcrums which extend longitudinally of the scale or parallel to the direction of movement of the wheel, it is not necessary to have the wheel positioned as accurately on the scale in order to insure substantially uniform distribution of the weight between the two levers. Also, the use of this design allows the use of a wider lever with a shorter lever arm and therefore results in decreased stress in the lever, and less motion in the lever system.

A significant feature of the embodiment shown comprises the attachment of one link to the piston by means of a rigid connection while the other link floats freely on top of the piston. The floating link is positioned so as to bear directly on the center of the piston so that it does not load the piston eccentrically, and furthermore, the fact that the other link is rigidly attached causes forces exerted through this link to also be effectively exerted at the center of the piston so that it does not eccentrically load the piston. Also, since the links are made of the same material they will maintain the same lever ratio despite any temperature changes and will continue to bear upon substantially the center of the piston. The base is preferably of aluminum, while the links are preferably steel, so that the base dimensions change with temperature more than the link dimensions.

The diaphragm is sealingly retained in engagement with the bottom 30 of the chamber 26 by means of a clamp ring 86 which clamps the edge of the diaphragm against the bottom 30 and also against an O-ring 88 which circumscribes the diaphragm chamber 40. Cap screws (not shown) may be used to hold the clamp ring down.

The weighing mechanism of this invention may also be used for dynamic weighing; that is, for weighing a truck while the wheel is moving across the scale. In such weighing, a damping valve is placed in the fluid conduit 78 to dampen fluctuations in the fluid pressure as the wheel passes over the scale and means is provided to retain the reading on the pressure gauge. It is then possible to weigh the truck much more quickly by getting a rough measurement as the truck moves across the scale and then, if it appears to be close to the limit, measure the weight statically by stopping the wheels on the scale.

Many modifications of this invention will be apparent to those skilled in the art. Although in the preferred embodiment described herein, a particular diaphragm together with the diaphragm chamber and fluid system have been described as constituting a load cell through which forces are exerted to indicate the loading on the platform, other load cells well known in the art may also be used. For example, a strain gauge type load cell such as that shown in U.S. Patent No. 2,962,276 to Thurston may be used.

Thus, the present invention is not limited to the particular embodiment shown and described herein.

I claim:
1. Weighing apparatus comprising
   a load cell actuable, upon the application of a load thereto to provide a signal proportional to said load,
   a longitudinally extending scale platform, and linkage means connecting said scale platform to said load cell,
wherein the improvement comprises
fulcrum means extending longitudinally of said scale platform on each side of said load cell,
each fulcrum means supporting one link of said load cell.

2. Weighing apparatus as defined by claim 1 wherein the linkage means comprises
a link on each side of said load cell,
a fulcrum extending along each edge of the apparatus to support the links,
and bearing means on each link positioned between the fulcrum and the load cell to support the scale platform.

3. Weighing apparatus as defined by claim 1 wherein the linkage means comprises
a link on each side of said load cell, one of said links being fixedly secured to the load cell, and
the other link being free to move laterally on the load cell.

4. Weighing apparatus comprising
a longitudinally extending base,
an upwardly opening depression in said base,
a longitudinally extending scale platform overlying said depression,
a pair of laterally extending scale levers beneath the platform,
fulcrum means supporting each lever,
bearing means between each lever and the platform for supporting the platform thereon,
a load cell in said depression between said bearing means engageable by said levers and actuable upon the application of a load thereto to provide a signal proportional to said load,
wherein the improvement comprises
the positioning of said fulcrum means to extend longitudinally of said base, whereby the lever arms extend at right angles to the scale platform.

5. Weighing apparatus as defined by claim 4 wherein the improvement comprises
positioning the fulcrum means and the bearing means to extend longitudinally of the scale platform.

6. Weighing apparatus as defined by claim 4 wherein one scale lever is fixedly secured to the load cell and the other is free to move laterally on it.

7. Weighing apparatus in which weight is measured by exerting force on a diaphragm enclosing a fluid system and measuring the pressure of the fluid,
wherein the improvement comprises
a solid member overlying the diaphragm and through which the force is transmitted,
and a pair of links pivoted at points equidistant from the center of the solid member to transmit force to said solid member,
one of said links being free to move laterally on said solid member, and engaging said solid member at its center,
and the other link being fixedly secured to the solid member.

8. Weighing apparatus comprising
a diaphragm enclosing a pressure-tight fluid system,
means for measuring the pressure of the fluid to determine the load on said diaphragm,
a solid member engaging said diaphragm to transmit load thereto,
and a longitudinally extending scale platform to which a load to be weighed may be applied,
wherein the improvement comprises
a link on each side of said solid member engaging said solid member,
a fulcrum extending along each edge of the apparatus longitudinally of the scale platform to support the outer ends of the links,
and bearing means on each link positioned between the fulcrum and the solid member to support the scale platform.

9. In weighing apparatus in which weight is measured by exerting force on a load cell through a pair of levers, the improvement which comprises
one lever affixed to the load cell and the other freely movable laterally thereon and including
a frictionless bearing between the freely movable lever and the load cell,
the frictionless bearing comprising
a first block having parallel flat surfaces, one of which engages the lever,
a plurality of bearing pins in engagement with the other face,
and a second block having a flat surface engaging the bearing pins.

10. Weighing apparatus in which weight is measured by exerting a force on a load cell and measuring the force exerted,
wherein the improvement comprises
a solid memer overlying the load cell and through the force is transmitted,
and a pair of links pivoted at points equidistant from the center of the solid member to transmit force to said solid member,
one of said links being free to move laterally on said solid member at its center,
and the other link being fixedly secured to the solid member.

11. In weighing apparatus as defined by claim 7, a frictionless bearing between the freely movable lever and the load cell.

References Cited

UNITED STATES PATENTS

| 1,844,080 | 2/1932 | Troll | 177—161 X |
| 1,895,502 | 1/1933 | Vernet et al. | 177—256 X |
| 3,164,218 | 1/1965 | McClimon | 177—208 X |
| 3,191,701 | 6/1965 | Gray | 177—209 |

FOREIGN PATENTS

| 231,116 | 3/1925 | Great Britain. |

RICHARD B. WILKINSON, Primary Examiner

G. H. MILLER, SR., Assistant Examiner

U.S. Cl. X.R.

177—256